(12) United States Patent
Okimoto

(10) Patent No.: US 7,905,511 B2
(45) Date of Patent: Mar. 15, 2011

(54) VEHICLE BRACKET

(75) Inventor: Kohei Okimoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 147 days.

(21) Appl. No.: 12/244,161

(22) Filed: Oct. 2, 2008

(65) Prior Publication Data

US 2009/0091102 A1 Apr. 9, 2009

(30) Foreign Application Priority Data

Oct. 4, 2007 (JP) ................................. 2007-260548

(51) Int. Cl.
*B60R 21/20* (2011.01)

(52) U.S. Cl. ................................. 280/728.2; 280/730.2

(58) Field of Classification Search ............... 280/728.2, 280/730.2
See application file for complete search history.

(56) References Cited

U.S. PATENT DOCUMENTS

| | | | | |
|---|---|---|---|---|
| 5,533,750 A * | 7/1996 | Karlow et al. | ............ | 280/730.2 |
| 5,700,028 A * | 12/1997 | Logan et al. | ............ | 280/728.2 |
| 5,941,556 A * | 8/1999 | Rose | ............ | 280/728.2 |
| 6,149,185 A * | 11/2000 | White et al. | ............ | 280/728.2 |
| 6,161,865 A * | 12/2000 | Rose et al. | ............ | 280/728.3 |
| 6,173,990 B1 * | 1/2001 | Nakajima et al. | ............ | 280/730.2 |
| 6,312,008 B1 * | 11/2001 | Neag | ............ | 280/728.2 |
| 6,409,209 B2 * | 6/2002 | Amamori et al. | ............ | 280/728.2 |
| D471,080 S * | 3/2003 | Baumbach | ............ | D8/354 |
| 6,585,287 B1 * | 7/2003 | Spaulding et al. | ............ | 280/728.2 |
| 7,134,685 B2 * | 11/2006 | Panagos et al. | ............ | 280/730.2 |
| 7,695,004 B2 * | 4/2010 | Inoue | ............ | 280/730.2 |
| 7,703,796 B2 * | 4/2010 | Manire et al. | ............ | 280/728.2 |
| 7,735,857 B2 * | 6/2010 | Hidaka et al. | ............ | 280/730.2 |
| 2001/0035632 A1 * | 11/2001 | Amamori et al. | ............ | 280/728.2 |
| 2001/0040360 A1 * | 11/2001 | Ishiyama et al. | ............ | 280/728.2 |
| 2002/0067029 A1 * | 6/2002 | Guthke et al. | ............ | 280/730.2 |
| 2004/0080144 A1 * | 4/2004 | Enders | ............ | 280/728.2 |
| 2004/0090049 A1 * | 5/2004 | McCann et al. | ............ | 280/728.2 |
| 2005/0156412 A1 * | 7/2005 | Panagos et al. | ............ | 280/730.2 |
| 2005/0225060 A1 * | 10/2005 | Wold | ............ | 280/728.2 |
| 2007/0063490 A1 * | 3/2007 | Minamikawa | ............ | 280/728.2 |
| 2009/0206580 A1 * | 8/2009 | Torii | ............ | 280/728.2 |
| 2010/0066060 A1 * | 3/2010 | Kalandek | ............ | 280/728.2 |

FOREIGN PATENT DOCUMENTS

| | | |
|---|---|---|
| JP | 2000-247203 | 9/2000 |
| JP | 2006-096291 | 4/2006 |
| JP | 2007-083781 | 4/2007 |

* cited by examiner

*Primary Examiner* — Eric Culbreth
*Assistant Examiner* — Karen A Beck
(74) *Attorney, Agent, or Firm* — Rankin, Hill & Clark LLP

(57) ABSTRACT

A vehicle bracket long in one direction includes a base portion, an attachment portion configured to be integrally formed with the base portion and to be attached to a vehicle component, and a rotation stopper portion configured to be integrally formed with the base portion and to prevent the bracket from being rotated with respect to a vehicle body. Upper and lower sides of the bracket have a symmetric shape with respect to a longitudinal direction axis in a state of the bracket being attached to the vehicle body.

4 Claims, 7 Drawing Sheets

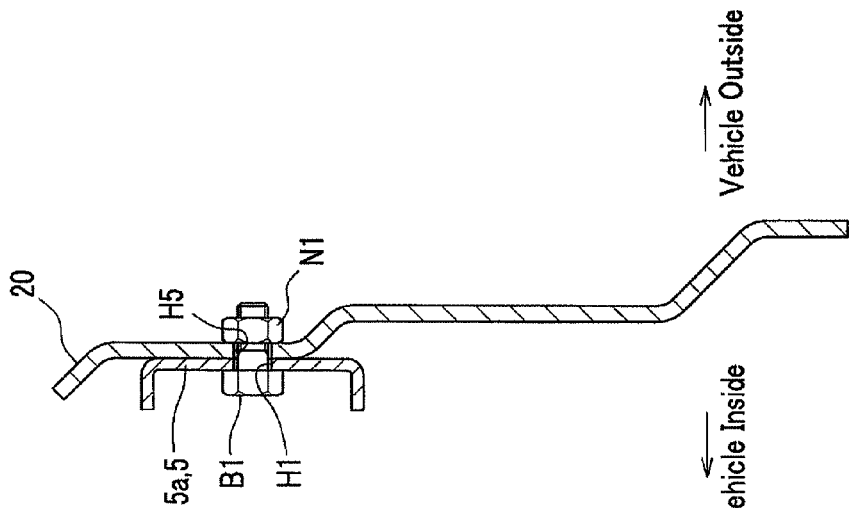
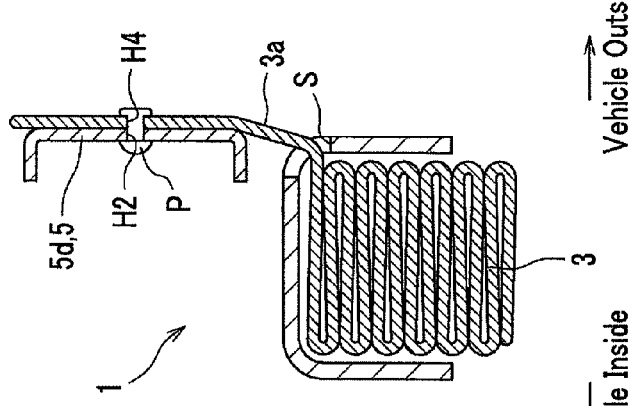
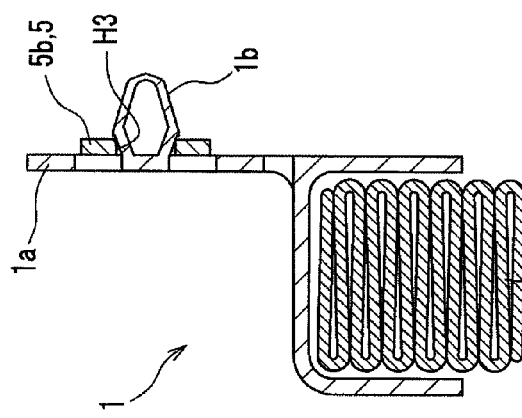

VEHICLE BRACKET

BACKGROUND OF THE INVENTION

1. Field of the Invention

The present invention relates to a vehicle bracket for attaching a vehicle component to a vehicle body.

2. Description of the Related Art

Conventionally, a vehicle bracket is known where airbag devices are attached to both of left and right roof side rails, respectively (for example, see Japanese Patent Laid-Open Publication No. 2007-83781 and 2006-96291, and Japanese Patent No. 3160670). FIG. 7 referred here is a perspective view showing a configuration of a conventional vehicle bracket used for attaching an airbag device.

As shown in FIG. 7, a vehicle bracket 55 is for attaching a folded airbag 53 to a vehicle inside of a roof side rail 70 and includes a base portion 55a, a fixation portion 55e to be fixed on the rail 70, attachment portions 55b of the airbag 53, and a rotation stopper portion 55c for preventing the vehicle bracket 55 from being rotated with respect to the rail 70.

The base portion 55a is formed of a plate and disposed between the roof side rail 70 and the airbag 53. The fixation portion 55e is formed so as to protrude upward from an upper end of the base portion 55a and has a bolt hole H11. Each of the attachment portions 55b is formed of a segment folded back from the base portion 55a toward the airbag 53, and is provided at front and rear of the base portion 55a so as to interpose the fixation portion 55e (see FIG. 7). The rotation stopper portion 55c is formed of a segment folded back toward a vehicle outside from the fixation portion 55e. On the other hand, in the airbag 53 is formed a tongue 53a where a bolt hole H12 is formed, and in the roof side rail 70 are formed a bolt hole H13 and a hole H14 at positions corresponding to the bolt hole H11 of the fixation portion 55e and the rotation stopper portion 55c, respectively.

In accordance with the vehicle bracket 55, a bolt B11 inserted through the bolt holes H12, H11, and H13 is screwed in a nut N11, and thereby, the fixation portion 55e and the tongue 53a of the airbag 53 are fastened to the roof side rail 70. In other words, the fixation portion 55e and the tongue 53a are attached to the roof side rail 70 through the vehicle bracket 55. At this time, the rotation stopper portion 55c of the vehicle bracket 55 fits in the hole H14 of the roof side rail 70, and thereby, the vehicle bracket 55 is prevented from being rotated with respect to the side rail 70.

However, in accordance with the conventional vehicle bracket 55, if an airbag (not shown) of a symmetric structure to the airbag 53 is attempted to be attached to a roof side rail (not shown) positioned on an opposite side of a vehicle, a vehicle bracket (not shown) of a symmetric structure to the vehicle bracket 55 must be prepared separately. Furthermore, if the vehicle bracket 55 is attempted to be used in common with attaching the airbag to the roof side rail on the opposite side, the rotation stopper portion 55c is positioned at a reverse position changed in a forward-and-rearward direction. Therefore, in accordance with the vehicle bracket 55, the hole H14 must be separately provided in the roof side rail 70 at a position corresponding to the rotation stopper portion 55c of the reverse position. Furthermore, if the roof side rails 70, 70 of a same structure are attempted to be used on both of left and right sides of the vehicle, the hole H14 is separately provided, and thereby, a hole not used for fitting the rotation stopper portion 55 therein results in being also formed excessively in the roof side rails 70, 70.

In other words, in accordance with the conventional vehicle bracket 55, when a vehicle component such as an airbag disposed on both of left and right sides of a vehicle is attached to a vehicle body, there is a problem that an efficiency of attaching the vehicle component to the vehicle body is poor, because two kinds of vehicle brackets of a symmetric structure must be prepared for the left and right sides of the vehicle and a hole must be separately provided in roof side rails.

Consequently, there is a need for a vehicle bracket excellent in the efficiency of attaching a vehicle component to a vehicle body, compared to a conventional vehicle bracket.

SUMMARY OF THE INVENTION

A vehicle bracket of the present invention to solve the problem is a vehicle bracket long in one direction and comprises: a base portion; an attachment portion configured to be integrally formed with the base portion and to be attached to a vehicle component; and a rotation stopper portion configured to be integrally formed with the base portion and to prevent the bracket from being rotated with respect to a vehicle body. Upper and lower sides of the bracket have a symmetric shape with respect to a longitudinal direction axis in a state of the bracket being attached to the vehicle body.

In accordance with the vehicle bracket, when the vehicle component disposed on both of left and right sides of a vehicle is attached to a vehicle body, because the upper and lower sides of the bracket have a symmetric shape with respect to the longitudinal direction axis, it is possible by making the bracket upside down to use it in a state of being disposed on any one of the left and right sides, in common with the bracket disposed on the other side. In other words, between the vehicle bracket on the other side whose upper and lower sides are reversed and the bracket on the one side before being reversed, positions of their attachment portions and those of their rotation stopper portions do not mutually change. As a result thereof, in accordance with the vehicle bracket, it is unnecessary to separately prepare the bracket of a symmetric structure for both of the left and right sides of a vehicle. Then it is also unnecessary according to both of the left and right sides of the vehicle to change an attachment structure of the vehicle body, where the vehicle bracket is attached, and that of the vehicle component attached to the bracket. Accordingly, manufacturing cost is reduced, and also no mistake occurs in attaching the vehicle bracket to the vehicle body on both of the left and right sides of the vehicle and in attaching the vehicle component to the vehicle bracket.

Accordingly, the vehicle bracket is excellent in the efficiency of attaching the vehicle component to the vehicle body, compared to a conventional vehicle bracket (for example, see the JP 2007-83781).

Then because the upper and lower sides of the vehicle bracket are configured to have a symmetric shape with respect to the longitudinal direction axis, it is possible to effectively utilize spaces formed on and under the bracket in upward and downward directions.

Furthermore, in accordance with the vehicle bracket thus described, the attachment portions are preferably formed at longitudinal both ends of the bracket, respectively, and holes of a same shape are preferably formed in the attachment portions, respectively.

In accordance with the vehicle bracket, because the attachment portion is formed at the longitudinal both ends, a width in upward and downward directions is reduced in comparison with a vehicle bracket where the attachment portion is formed in the upward and downward directions. Accordingly, it is possible to favorably use the vehicle bracket when the vehicle component is attached to a place, for example, such as the vicinity of a floor and roof of a vehicle, where an attachment width is restricted in the upward and downward directions.

Furthermore, in accordance with the vehicle bracket, because the hole of a same shape is formed in each of the attachment portion, it is possible to simplify an attachment structure of the vehicle component attached through the hole.

Furthermore, the vehicle bracket thus described may further comprise a sub-attachment portion configured to be attached to a sub-component arranged integrally with the vehicle component.

Furthermore, in accordance with the vehicle bracket, the attachment portion, the rotation stopper portion, and the sub-attachment portion are preferably disposed in line with the longitudinal direction.

Furthermore, the vehicle bracket is for attaching an airbag device to the vehicle body, and the vehicle component may be assumed to be a cover body configured to accommodate an airbag as the sub-component.

Because the vehicle bracket of the present invention can be used in common on both of the left and right sides of a vehicle, it is excellent in the efficiency of attaching the vehicle component to the vehicle body, compared to a conventional vehicle bracket. Furthermore, because the upper and lower sides of the vehicle bracket of the invention are configured to have a symmetric shape with respect to the longitudinal direction axis, it is possible to effectively utilize spaces formed on and under the bracket in the upward and downward directions.

BRIEF DESCRIPTION OF THE DRAWINGS

FIG. 5A is a Va-Va section drawing of FIG. 3 showing a state of the cover body being attached to the vehicle bracket; FIG. 5B is a Vb-Vb section drawing of FIG. 3 showing a state of the airbag being attached to the vehicle bracket; and FIG. 5C is a Vc-Vc section drawing of FIG. 3 showing a state of the vehicle bracket being attached to the vehicle body.

BEST MODE(S) FOR CARRYING OUT THE INVENTION

Here will be described an embodiment of a vehicle-body front structure relating to the present invention in detail with reference to drawings as needed. In addition, in a description below forward and rearward directions and upward and downward directions match those of a vehicle, respectively, and are based on directions shown in FIG. 1.

A vehicle bracket according to the embodiment is for attaching an airbag device to a roof side rail. Here, after the airbag device is described, the vehicle bracket will be described. In addition, as well known, although the airbag devices of a symmetric structure are provided on both of left and right sides of a vehicle, respectively, only one airbag device disposed on the right side of the vehicle will be described in a description below, and the other disposed on the left side will be omitted because a main configuration thereof is the same.

Figure 1:
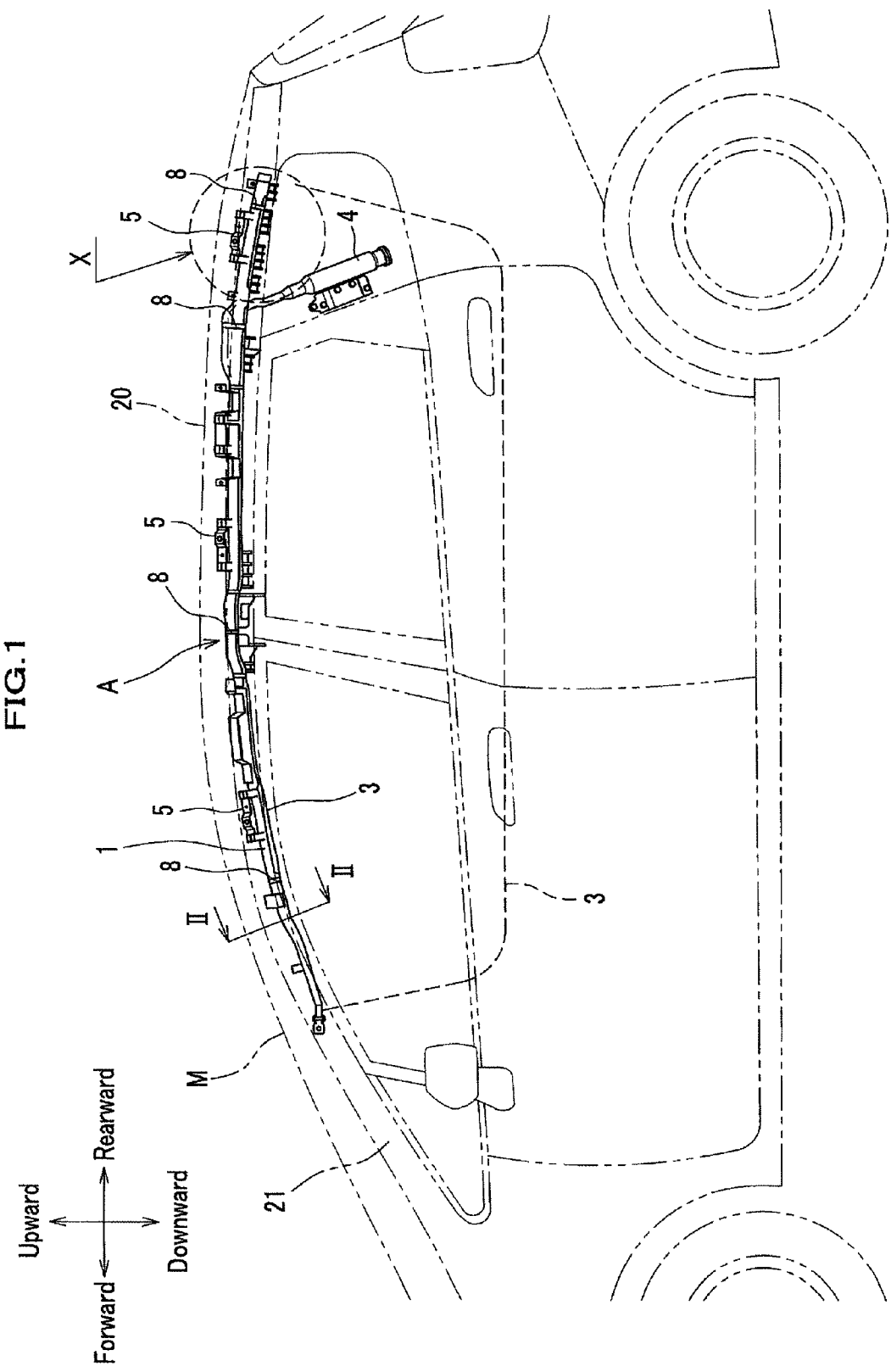
FIG. 1 is a side view of an airbag device as a vehicle component disposed on a right side of a vehicle and seen from a vehicle inside, which the airbag device is attached to a vehicle body by using a vehicle bracket according to an embodiment of the present invention.

As shown in FIG. 1, an airbag device A is for protecting a passenger by developing an airbag 3 at collision of a vehicle M, and is extendedly provided along the forward and rearward directions above a door opening (not shown) of the vehicle M. Specifically, the airbag device A is a long member and is placed on a vehicle inside from a front pillar 21 across a roof side rail 20.

The airbag device A comprises the airbag 3, a cover body 1 configured to accommodate the airbag 3, and an inflator 4 configured to develop the airbag 3. In this connection, the airbag 3, the cover body 1, and the inflator 4 are made into a module, and are designed to be able to be integrally handled. The cover body 1 and the airbag 3 are assembled into the roof side rail 20 through vehicle brackets 5, which will be described later, provided at an appropriate place (three places according to the embodiment) in a longitudinal direction of the airbag device A.

Figure 2:
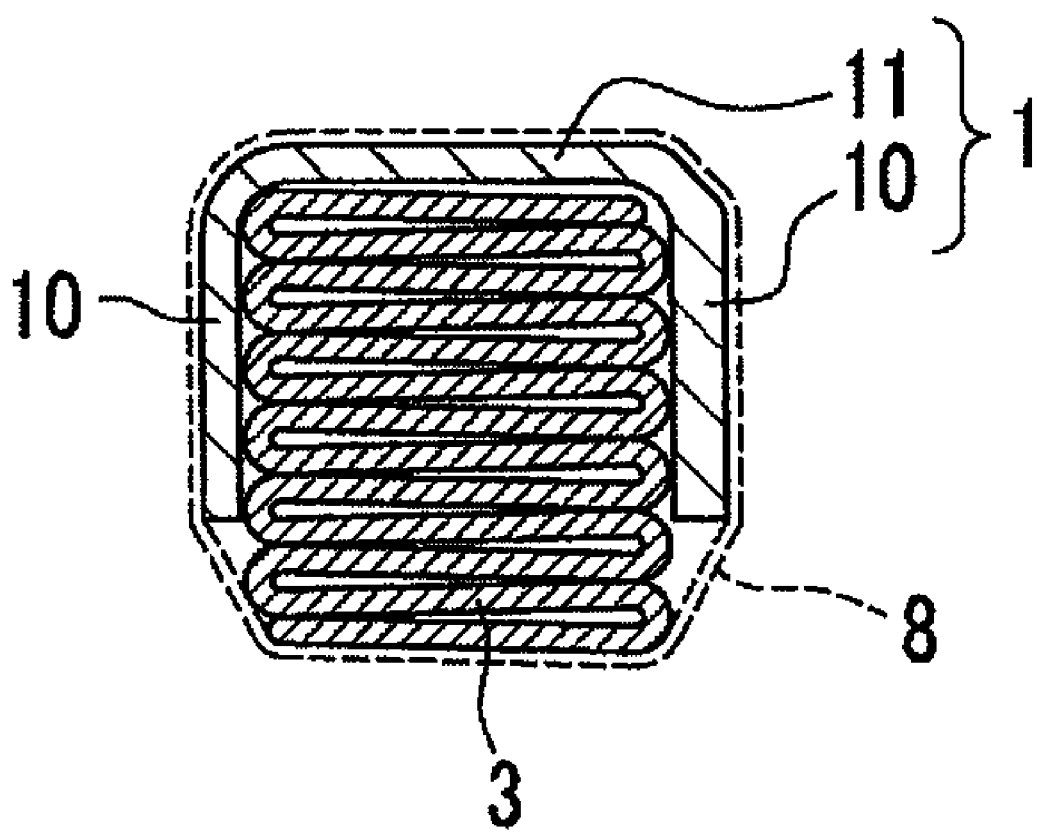
FIG. 2 is a II-II section drawing of FIG. 1 showing a section of a cover body for accommodating an airbag.

As shown in FIG. 2, the cover body 1 has a pair of opposing walls 10, 10 and a connection wall 11 configured to connect the walls 10, 10 at their upper ends with each other, and expresses an approximately left-side-open-rectangle letter form in a section view.

The airbag 3 is folded like a cornice and accommodated in the cover body 1. Then the airbag 3 is bundled by bands 8 provided at a plurality of appropriate places in a longitudinal direction (direction vertical to a paper face of FIG. 2) of the cover body 1; thereby, a folded state of the airbag 3 is maintained in the cover body 1.

Figure 3:
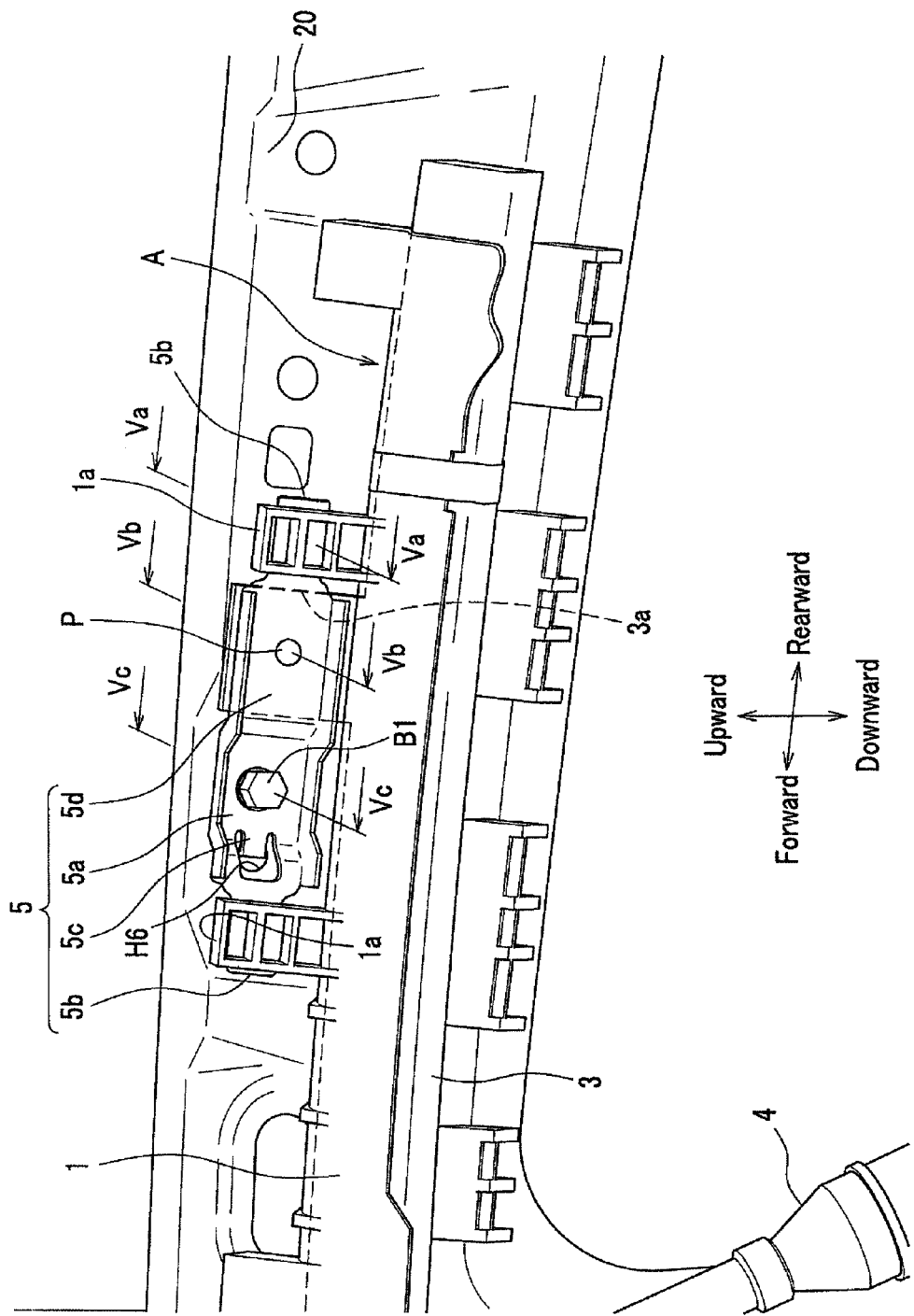
FIG. 3 is a partially enlarged drawing of an X portion in FIG. 1 and showing a state of the airbag device as a vehicle component being attached to a roof side rail as a vehicle body through the vehicle bracket according to the embodiment.

As shown in FIG. 3, the cover body 1 comprises support portions 1a configured to be supported by a corresponding vehicle brackets 5 described later. Each of the support portions 1a extends from the cover body 1 to the vehicle bracket 5 disposed above the body 1. A pair of the support portions 1a is provided for every vehicle brackets 5, 5, 5 (see FIG. 1) at the three places, and the support portions 1a extend as far as attachment portions 5b, 5b, respectively, disposed at the longitudinal both ends of the vehicle bracket 5 described later.

Furthermore, as shown in FIG. 3, the airbag 3 comprises a tongue 3a attached to the vehicle bracket 5 described later. The tongue 3a extends from an upper end of the airbag 3 toward the vehicle bracket 5 disposed above the airbag 3. The tongue 3a is provided one by one for the every vehicle brackets 5, 5, 5 (see FIG. 1) at the three places, and extends to a sub-attachment portion 5d of the vehicle bracket 5 described later through a slit (not shown in FIG. 3 but shown in FIG. 5B as a slit S described later) formed in the cover body 1. In the tongue 3a is formed a pin hole (not shown in FIG. 3, but shown in FIG. 5B as a pin hole H4 described later) configured to insert a pin P.

In addition, the cover body 1 where the airbag 3 has been accommodated is covered with a roof garnish and a pillar garnish, both not shown, disposed on a vehicle inside of the airbag 3 and the body 1. Then at the collision of the vehicle M shown in FIG. 1, a gas is instantaneously ejected from the inflator 4, and thereby, the airbag 3 develops downward like a curtain from the roof side rail 20 side as shown in a broken line in FIG. 1. In this connection, in a case of the airbag 3 being developed, the bands 8 (see FIG. 2) are broken and the garnishes (not shown) are detached, and thereby, the airbag 3 is developed.

Next will be described the vehicle bracket 5 according to the present invention.

Figure 4:
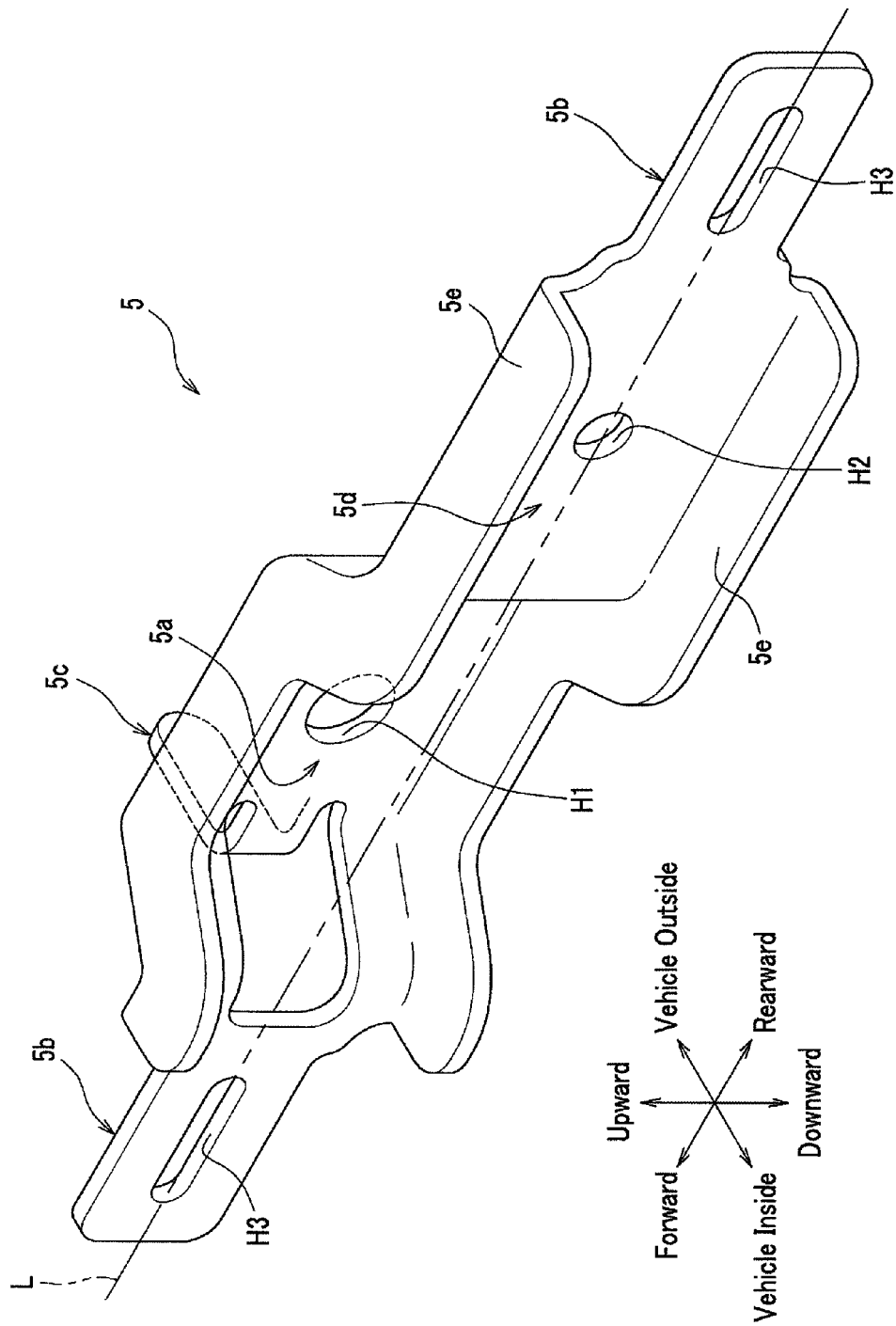
FIG. 4 is a perspective view of the vehicle bracket seen from a position corresponding to an oblique rear upper position of a vehicle inside in a state of being attached to the vehicle body as shown in FIG. 3.

As shown in FIG. 4, the vehicle bracket 5 of the embodiment is a long member in the forward and rearward directions of the vehicle M (see FIG. 1) and is made by press-forming a plate. The vehicle bracket 5 comprises a base portion 5a, which is a base, attached to the roof side rail 20 (see FIG. 3) as a vehicle body; attachment portions 5b configured to be attached to the cover body 1 (see FIG. 3) as a vehicle component; a rotation stopper portion 5c configured to prevent the bracket 5 from being rotated with respect to the roof side rail 20; and a sub-attachment portion 5d configured to be attached to the airbag 3 (see FIG. 3) as a sub-component.

The vehicle bracket 5 defines a contact face where a vehicle outside of the base portion 5a contacts with a vehicle-inside side face of the roof side rail 20. Then after the vehicle bracket 5 is bent toward a vehicle inside at front and rear sides of the base portion 5a, the bracket 5 is further bent so as to define a face opposing the vehicle-inside side face of the roof side rail 20 (see FIG. 3); thereby, the bracket 5 forms the attachment portion 5b on the front side of the base portion 5a, and the sub-attachment portion 5d and the attachment portion 5b on the rear side of the base portion 5a in this order. Then a part of a plate heading from the base portion 5a toward the attachment portion 5b on the front side is cut out like a tongue and is folded back to the vehicle outside, and thereby, the rotation stopper portion 5c is formed.

In other words, the attachment portions 5b, the sub-attachment portion 5d, and the rotation stopper portion 5c are formed in line with the longitudinal direction of the vehicle bracket 5.

In addition, each of upper and lower edges of the vehicle bracket 5 includes a fold-back portion 5e folded back to the vehicle inside, and the portion 5e heighten a rigidity of the vehicle bracket 5.

Then in the base portion 5a is formed a bolt hole H1. Furthermore, in the sub-attachment portion 5d is formed a pin hole H2.

The attachment portions 5b are disposed at the longitudinal both ends of the vehicle bracket 5, respectively, and in each of the attachment portions 5b, 5b is formed an elongated hole H3. The elongated holes H3, H3 are long in the forward and rearward directions, and have a same shape with each other.

In accordance with the vehicle bracket 5 thus described, the upper and lower sides thereof have a symmetric shape with respect to a longitudinal direction axis L (center line) shown in FIG. 4 in a state of the bracket 5 being attached to the vehicle-inside side face of the roof side rail 20 (see FIG. 3).

Next will be described a manner of attaching the cover body 1 as a vehicle component and the airbag 3 as a sub-component to the roof side rail 20 as a vehicle body by using the vehicle bracket 5 according to the embodiment with reference to FIGS. 5A, 5B, and 5C.

As shown in FIG. 5A, a clip 1b formed in the support portion 1a of the cover body 1 is inserted in the elongated hole H3 formed in the attachment portion 5b of the vehicle bracket 5, and thereby, the body 1 is attached to the vehicle bracket 5.

Furthermore, as shown in FIG. 5B, the tongue 3a of the airbag 3 extracted from the slit S formed in the cover body 1 is disposed on the vehicle outside of the sub-attachment portion 5d of the vehicle bracket 5. In the tongue 3a of the airbag 3 is formed the pin hole H4, and the pin P is inserted in the hole H4 and the pin hole H2 of the sub-attachment portion 5d of the vehicle bracket 5 and a top of the pin P is caulked; thereby, the airbag 3 is attached to the bracket 5. In this connection, because the slit S is formed in the cover body 1 near the vehicle outside, it is possible to form a space for disposing a harness and the like on the body 1.

Furthermore, as shown in FIG. 5C, a bolt B1 is inserted through the bolt hole H1 formed in the base portion 5a of the vehicle bracket 5, and a bolt hole H5 formed in the roof side rail 20. Then the bolt B1 is screwed in a nut N1, and thereby, the vehicle bracket 5 where the cover body 1 (see FIG. 5A) and the airbag 3 (see FIG. 5A) are attached is fastened to the roof side rail 20.

Then as shown in FIG. 3, the rotation stopper portion 5c of the vehicle bracket 5 fits in a hole H6 formed in the roof side rail 20.

Next will be described an action and effect of the vehicle bracket 5 according to the embodiment.

In accordance with the vehicle bracket 5, it is possible to use the bracket 5 in common for both of the left and right sides of the vehicle M in attaching the airbag device A (cover body 1, airbag 3) disposed on both of the left and right sides to the roof side rail 20. To be described more in detail, the upper and lower sides of the vehicle bracket 5 have a symmetric shape with respect to the longitudinal direction axis L, it is possible by making the upside of the bracket 5 down to use it in a state of its being attached to any one of the left side and the right side, in common with the bracket 5 disposed on the other side. In other words, in accordance with the vehicle bracket 5 upside down and disposed on the other side, with respect to that disposed on the one side before being upside down, respective positions of their attachment portions 5b, sub-attachment portions 5d, and rotation stopper portions 5c do not change.

As a result thereof, in accordance with the vehicle bracket 5, it is unnecessary to separately prepare the bracket 5 of a symmetric structure for both of the left and right sides of the vehicle M. Then it is also unnecessary to change the attachment structure of the roof side rail 20, where the bracket 5 is attached, and those of the cover body 1 and the airbag 3 attached to the bracket 5, according to both of the left and right sides of the vehicle M. Accordingly, manufacturing cost is reduced, and also no mistake occurs in attaching the vehicle bracket 5 to the roof side rail 20 on both of the left and right sides of the vehicle M and in attaching the cover body 1 and the airbag 3 to the vehicle bracket 5. Accordingly, the vehicle bracket 5 is excellent in the efficiency of attaching the cover body 1 and the airbag 3 to the roof side rail 20, compared to a conventional vehicle bracket (for example, see the JP 2007-83781).

Then in accordance with the vehicle bracket 5, because the upper and lower sides thereof are configured to have a symmetric shape with respect to the longitudinal direction axis L, it is possible to effectively utilize spaces formed on and under the bracket in the upward and downward directions.

Particularly, it is possible to favorably use the vehicle bracket 5 of the present invention when a vehicle component not limited to the airbag device A is attached to a place such as the vicinity of a floor and roof of a vehicle, where an attachment width is restricted in the upward and downward directions.

Furthermore, in accordance with the vehicle bracket 5, because the attachment portion 5b is formed at the longitudinal both ends, the width of the bracket 5 in the upward and downward directions is reduced in comparison with a vehicle bracket where the attachment portions 5b are attached in the upward and downward directions. Then in accordance with the vehicle bracket 5, because the attachment portions 5b, the sub-attachment portion 5d, and the rotation stopper portion 5c are formed in line with the longitudinal direction L of the bracket 5, the width thereof is surely reduced in the upward and downward directions.

Figure 6:
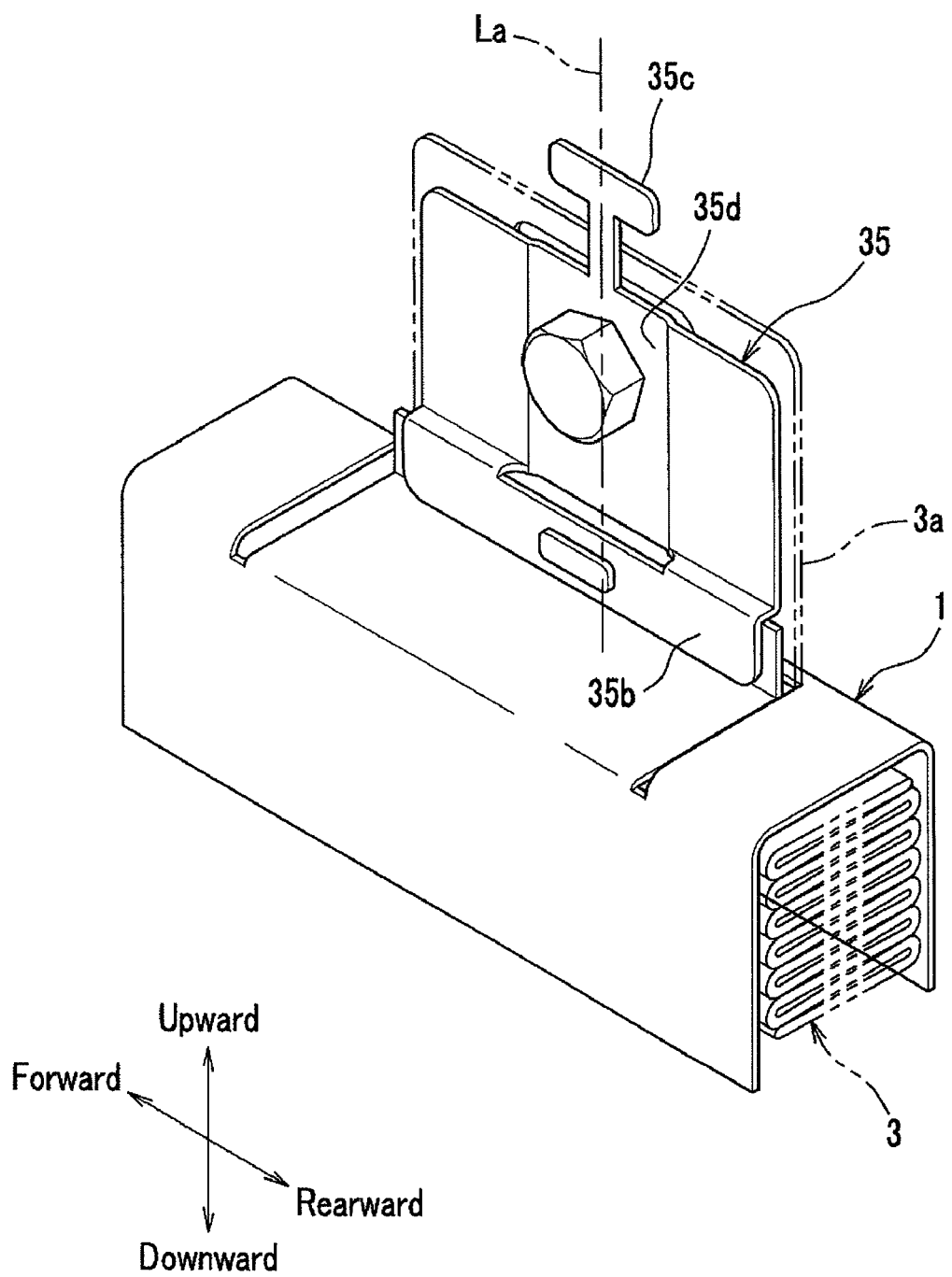
FIG. 6 is a perspective view of a vehicle bracket as a comparison example.
Figure 7:
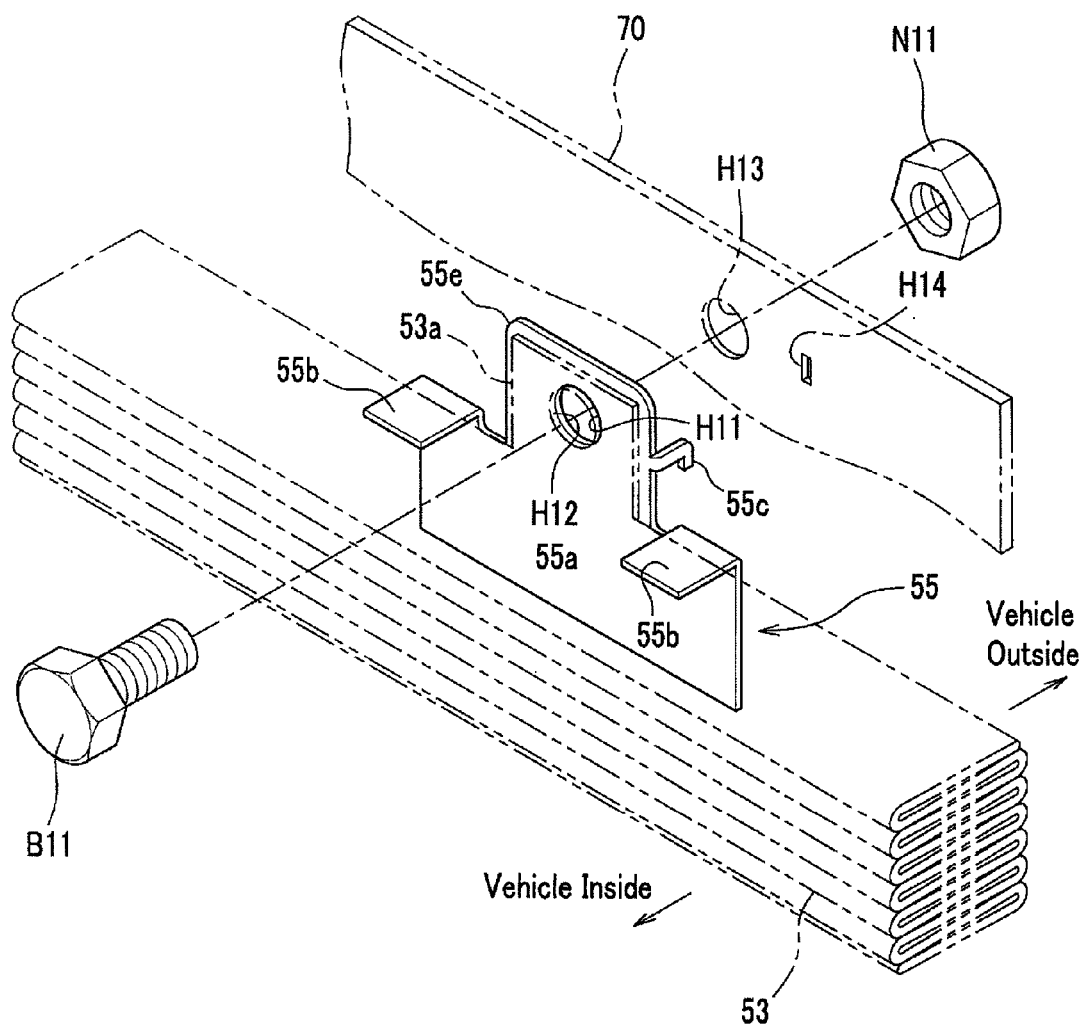
FIG. 7 is a perspective view showing a configuration of a conventional vehicle bracket used for attaching an airbag device.

As shown in FIG. 6, a vehicle bracket 35 (comparison example) has a symmetric shape in forward and rearward directions with respect to an upward-and-downward-directions axis La. Then an attachment portion 35*b* for attaching the cover body 1, a sub-attachment portion 35*d* for attaching the tongue 3*a* of the airbag 3, and a rotation stopper portion 35*c* are disposed in line with upward and downward directions.

The vehicle bracket 5 of the present invention is different from the vehicle bracket 35 of the comparison example in that: the former has a symmetric shape in the upward and downward directions with respect to the longitudinal direction L, while the latter has a symmetric shape in the forward and rearward directions with respect to the upward-and-downward-directions axis La.

In accordance with the vehicle bracket 35 of the comparison example thus described, it may seem to use the bracket 35 in common for both of the left and right sides of a vehicle by making the front and rear of the bracket 35 reverse. However, due to a relationship of an arrangement between the attachment portion 35*b*, the sub-attachment portion 35*d*, and the rotation stopper portion 35*c*, the width of the bracket 35 is wider than that of the vehicle bracket 5 of the embodiment in the upward and downward directions. In other words, the vehicle bracket 5 according to the embodiment can ensure spaces on and under the bracket 5 in the upward and downward directions more sufficiently than the vehicle bracket 35 of the comparison example.

Furthermore, in accordance with the vehicle bracket 5, because the elongated holes H3 of a same shape are formed in the attachment portions 5*b*, respectively, it is possible to make the attachment structure of the support portion 1*a* of the cover body 1 attached through the holes H3 to be simple like the clip 1*b*.

Furthermore, because the vehicle bracket 5 comprises the sub-attachment portion 5*d* configured to be attached to the airbag 3 arranged integrally with the cover body 1, it is possible to attach the cover body 1 and the airbag 3 lumped by one bracket 5 to the roof side rail 20.

The present invention is not limited to the embodiment and can be embodied by various embodiments.

Although in the embodiment the vehicle bracket 5 has been described which comprises the two attachment portions 5*b*, the one sub-attachment portion 5*d*, and the one rotation stopper portion 5*c*, numbers of the portion 5*b*, the portion 5*d*, and the portion 5*c* are not specifically limited in the invention.

In addition, as shown in FIG. 1, when a plurality of vehicle brackets 5 of the invention are disposed in the forward and rearward directions (or any one direction) of the vehicle M, it is preferable that an attachment direction is appropriately defined and controlled, for example, that all the vehicle brackets 5 are directed in a same direction for the purpose of preventing an erroneous assembly in integrating the brackets 5 with the airbag device A.

Furthermore, in accordance with the embodiment, although a bolt and nut, a clip, caulking of a pin, and the like have been described as an attachment structure, the invention is not specifically limited to the attachment structure, and other attachment structures by welding, an adhesive, and the like are available.

Furthermore, in accordance with the embodiment, although the vehicle bracket 5 configured to attach the cover body 1 and the airbag 3 to the roof side rail 20 has been described, a vehicle bracket configured to attach another element of the airbag device A, for example, the inflator 4 to another vehicle body portion such as a pillar is also available.

What is claimed is:

1. A vehicle bracket long in one direction, comprising:
    a base portion;
    first and second attachment portions configured to be integrally formed with the base portion for attachment to a vehicle component, the first and second attachment portions being located at opposing longitudinal ends of the bracket, wherein the first and second attachment portions each include a hole that is elongated or obround; and
    a rotation stopper portion configured to be integrally formed with the base portion and to prevent the bracket from being rotated with respect to a vehicle body,
    wherein a center of the hole of the first attachment portion and a center of the hole of the second attachment portion cooperate to define a longitudinal direction axis, and wherein the base portion, the first and second attachment portions, and the rotation stopper portion each have a symmetric shape with respect to the longitudinal direction axis in a state of the bracket being attached to the vehicle body.

2. A vehicle bracket long in one direction, comprising:
    a base portion;
    first and second attachment portions configured to be integrally formed with the base portion for attachment to a vehicle component, the first and second attachment portions being located at opposing longitudinal ends of the bracket, wherein the first and second attachment portions each include a hole that is elongated or obround;
    a rotation stopper portion configured to be integrally formed with the base portion and to prevent the bracket from being rotated with respect to a vehicle body; and
    a sub-attachment portion configured to be attached to a sub-component arranged integrally with the vehicle component,
    wherein a center of the hole of the first attachment portion and a center of the hole of the second attachment portion cooperate to define a longitudinal direction axis, and wherein the base portion, the first and second attachment portions, and the rotation stopper portion each have a symmetric shape with respect to the longitudinal direction axis in a state of the bracket being attached to the vehicle body.

3. A vehicle bracket long in one direction, comprising:
    a base portion;
    first and second attachment portions configured to be integrally formed with the base portion for attachment to a vehicle component, the first and second attachment portions being located at opposing longitudinal ends of the bracket, wherein the first and second attachment portions each include a hole that is elongated or obround;
    a rotation stopper portion configured to be integrally formed with the base portion and to prevent the bracket from being rotated with respect to a vehicle body; and
    a sub-attachment portion configured to be attached to a sub-component arranged integrally with the vehicle component,
    wherein a center of the hole of the first attachment portion and a center of the hole of the second attachment portion cooperate to define a longitudinal direction axis, and wherein the base portion, the first and second attachment portions, and the rotation stopper portion each have a symmetric shape with respect to the longitudinal direction axis in a state of the bracket being attached to the vehicle body, and wherein the attachment portions, the sub-attachment portion, and the rotation stopper portion are disposed in line with a longitudinal direction.

4. The vehicle bracket according to claim 2, wherein an airbag device is attached to the vehicle body through the bracket, and wherein the vehicle component is a cover body configured to accommodate an airbag as the sub-component.

* * * * *